Feb. 27, 1951   F. LYIJYNEN   2,543,582
PRESS
Filed March 10, 1949   4 Sheets-Sheet 1

Fig. 1.

INVENTOR.
Fred Lyijynen.
BY
Elwer Jannson Gray
ATTORNEY.

Feb. 27, 1951 F. LYIJYNEN 2,543,582
PRESS
Filed March 10, 1949 4 Sheets-Sheet 2

INVENTOR.
Fred Lyijynen.
BY
Elmer Jamison Gray
ATTORNEY.

Feb. 27, 1951

F. LYIJYNEN 2,543,582

PRESS

Filed March 10, 1949

INVENTOR.
Fred Lyijynen.
BY
Elmer Jamison Gray
ATTORNEY.

Patented Feb. 27, 1951

2,543,582

UNITED STATES PATENT OFFICE 2,543,582

PRESS

Fred Lyijynen, Detroit, Mich., assignor to Briggs Manufacturing Company, Detroit, Mich., a corporation of Michigan Application March 10, 1949, Serial No. 80,750

18 Claims. (Cl. 154—1)

The present invention relates to the fabrication of articles formed from laminations of sheet material pressed and bonded together, including panels useful for trimming the interiors of automobile or other vehicle bodies. The laminations of such panels are preferably bonded together between the heated platens of a multiple platen press by means of a thermoplastic or thermosetting plastic material. The invention in particular relates to an improved method and apparatus for fabricating such articles whereby the handling of the materials and the bonding or pressing cycle are materially expedited.

In the fabrication of vehicle trim panels, it is customary to bond the laminations for a number of panels simultaneously between the platens of a multiple platen type press. In such instances a tier of vertically spaced platens is usually employed within the press and these platens are simultaneously pressed together with an unbonded set of laminations for a panel arranged in superimposed relation between each pair of adjacent platens. During an operating cycle of the press a panel is thus produced within a given area between each pair of adjacent vertically spaced platens.

An example of a type of panel for which the present invention is particularly suited is the laminated interior trim panel for an automobile door. Such a panel may comprise a number of laminations including for example a rigid backing or foundation layer, a layer of an incompletely reacted thermosetting bonding resin preferably applied in a fibrous matrix of cloth or paper, a suitable padding or cushioning layer, and an exterior finish layer or cloth or plastic material, the layers being superimposed one above the other in the order named.

It is frequently desirable to compact and bond the exterior and underlying layers of the panel to each other and to the rigid foundation along preselected grooves or depressed regions by the selective application of pressure and heat to the panels in accordance with a desired ornamental pattern. This is accomplished in a preferred application of the present invention by placing the laminated but unbonded panel layers on a pattern forming die with the exterior or finish panel layer confronting the die. The face of the die adjacent the exterior finish layer of the panel is raised or upset at predetermined locations or along selected lines in accordance with the desired ornamental pattern to be impressed into the panel. The unbonded panel laminations and die are then pressed firmly together between a pair of heated platens which maintain the temperature and pressure required during the bonding operation to set or completely react the bonding resin between the panel layers.

Upon application of the heat and pressure between the platens, the bonding resin is fused and caused to permeate the various panel layers, particularly at the regions of optimum pressure exerted by the raised or upset portions of the pattern forming die whereat the panel layers are bonded together at a strong permanent seam. The portions of the panel face and underlying padding at the seams are obviously permanently embossed or impressed in accordance with the desired ornamental pattern of the die, whereas the portions of the padding between the regions of optimum pressure exerted by the raised die portions remain uncompressed to provide an upholstered or cushioned effect between the seams.

Prior to the present invention, it has been customary for an operator standing in front of the press to load and unload the platens manually. This procedure has not only been slow and costly, but it subjects the operator to the exhaustive heat of the platens and renders his job unduly fatiguing, disagreeable and dangerous to his health. As a consequence, frequent reliefs or rest periods for the operator are required and labor turnover on the job is high. In many types of press operations, a high degree of skill and on the job training is required of the operator, particularly where the timing of various portions of the molding or bonding cycle must be carefully controlled in accordance with slight variations in the platen temperatures or other factors. Thus frequent training or "breaking in" new personnel is costly, resulting in both reduced production from the press and a high percentage of rejects or improperly molded articles. Furthermore, where the heat of the platens and the fumes of the bonding operation are oppressive, manual loading and unloading of the press is retarded and expensive compression mechanism is rendered inoperative for appreciable periods of time after each compressing operation.

An important object of the present invention is to reduce the cost of manufacturing laminated articles, such as trim panels for example, by increasing the output of the press and press operator, while at the same time reducing the strain, discomfort and fatigue of the operator and the occupational danger to his health.

Another object of the present invention is to provide improved loading means for a panel bonding press whereby the panel laminations to be bonded together may be fed to the press and unloaded therefrom at locations removed from the direct heat of the platens and the fumes of the bonding operation.

Another object is to provide an improved panel feeding mechanism which is particularly but not exclusively adapted to feed unbonded panel laminations between the platens of a press, such as a multiple platen type press for example, and to withdraw the bonded panels from the press, and which is provided with alternately operative feeding mechanisms whereby unloading and reloading of either mechanism is permitted while the other mechanism is employed with the press in a bonding operation, thereby materially reducing the inoperative time of the press between bonding operations.

Other objects are to provide feeding or loading mechanisms of the foregoing character which carry a number of panel forming dies supported at proper intervals to permit their insertion between the platens of a multiple platen press, each die being adapted to support a panel loaded thereon for fabrication in the press and being also adapted to be loaded or unloaded exteriorly of the press; and to provide such mechanisms wherein the dies are mounted for movement with the platens when the latter are pressed together during a bonding operation.

Another and more specific object is to provide for a multiple platen press a feeding or loading mechanism having paired sets or tiers of panel forming dies suitably mounted and spaced so that each die with a panel supported thereon may be moved by swinging movements between loading and unloading positions exterior to the press and a pressing position between a corresponding pair of spaced platens within the press, the axes of swinging movement of the two sets of dies being spaced to permit alternate use of each set in a pressing operation while the other set is being loaded or unloaded.

Still other objects are to provide such a feeding or loading mechanism wherein each set of dies may be loaded or unloaded exteriorly of the press and wherein a limited pivotal movement of each die independently of the others is permitted to facilitate loading and unloading thereof; and to provide improved means for selectively swinging either set of dies as a unit toward or away from the platens of the press.

Another object of the present invention is to provide such a feeding or loading mechanism wherein each panel forming die is supported in turn by an individual swinging arm mounted for axial and pivotal movement on a vertical axis and adapted to support its die for horizontal swinging movement into and out of the press and also adapted to serve as a movement limiting or locating stop whereby, upon the limit of movement of the swinging arm toward the press, the supported die will be properly located within the press at the pressing position.

Other objects are to provide an improved mounting and supporting means for guiding the swinging arms accurately to their proper pressing positions between the platens, or to their loading and unloading positions exterior to the press; and to provide simple and improved supporting means of the foregoing character which also readily permit movement of the arms with the platens during a pressing operation, as for example axially of their axes of swinging movement.

Other objects are to provide a feeding or loading mechanism of the foregoing character which is particularly adapted to be used with existing hydraulically actuated presses and which may be readily powered from the same hydraulic pressure generator employed originally for the press alone, without interfering with the operation of the press or requiring supplemental pressure generating means; and to provide such a hydraulically actuated feeding or loading mechanism which is adapted for actuation while the platens of the press are released from pressure between pressing operations.

Other objects of this invention will appear in the following description and appended claims, reference being had to the accompanying drawings forming a part of this specification wherein like reference characters designate corresponding parts in the several views.

The above and other objects are accomplished in a preferred embodiment of the present invention comprising a multiple platen press having a set of vertically movable platens spaced one above another in a tier and mounted for vertical compressional movement between the upper and lower jaws of the press, whereby a plurality of panels interposed between the platens may be formed simultaneously. On each of a pair of vertical shafts suitably supported adjacent opposite ends of the press are a plurality or set of swinging die carrying arms, vertically spaced one above the other in accordance with the vertical spacing of the platens of the press and mounted for pivotal and axial movement on the shaft.

Each arm of each set carries an individual panel forming die which is adapted to receive and support the weight of a set of panel laminations or other material loaded thereon to be molded or formed thereby. Each arm is also mounted to swing horizontally toward the press and is spaced relative to a corresponding pair of platens of the press so as to carry its die and a panel thereon into the press between the said pair of corresponding platens, whereupon a pressing operation may be performed on the panel.

In the pressing operation, the vertically movable platens are forced together by hydraulic actuation of the press jaws, whereupon the vertically movable die supporting arms with the dies and the panels carried thereby move axially of their pivotal mountings in accordance with the vertical movement of the platens. Upon completion of the pressing operation, the pressure on the platens is released. The latter then return to their initial spaced positions as prior to the pressing operation. Thereafter the die supporting arms and dies thereon are swung from between the platens to unloading and reloading positions whereat the consolidated or bonded panels are removed from the dies and replaced by unbonded panels to permit a repetition of the above outlined cycle.

By the above mechanism, the two sets of swinging and vertically removable die supporting arms are advantageously employed alternately with each other between the platens during successive pressing operations. Thus while one set of arms is employed between the platens during a pressing operation, the other set of arms is loaded for the succeeding pressing operation. Accordingly the press is maintained essentially continuously operative with a resulting material increase in productivity.

In order to expedite the loading and unloading operations permitted by the present invention, suitable power operated means are preferably employed to swing the die supporting arms of each set as a unit to and from the pressing position within the press and the loading and unloading positions exterior to the press. Although it will be apparent that various mechanical power units may be employed for selectively operating the swinging movement of the arms, hydraulically actuated means are particularly convenient with hydraulic presses customarily employed in panel forming and bonding operations. In such instances the present invention may be readily adapted by means of a reducing valve for use with existing hydraulic press equipment by suitably connecting the hydraulic circuit or system for the swinging arms with the existing hydraulic pressure generator required to operate the press. No supplemental hydraulic pumping unit is required since the swinging arms are actuated to and from the pressing position only when the platens are not under pressure and when the hydraulic pressure generator is not in immediate use with the press.

The mounting for each swinging arm also permits a limited amount of pivotal movement of the arm at the loading and unloading positions independently of the other arms. This movement may be manually effected if desired, so that when a panel is loaded on the die carried by the uppermost arm, or unloaded therefrom as the case may be, the uppermost arm and die may be pivoted by the operator sufficiently to expose the underlying or second die carrying arm in the set. Thus each die carrying arm may be loaded or unloaded as the case may be and similarly pivoted to expose the successive underlying arm for loading or unloading thereof.

The panel forming die carried by each swinging arm preferably projects from the latter to permit the die and the laminations of a panel loaded thereon to be properly interposed between a pair of adjacent platens at the pressing position, whereat the arm is in abutting engagement with one of the platens. Thus the arm serves as a movement limiting or positioning stop which accurately locates the die with respect to the platens at the pressing position as the arm swings to the limit of its movement toward the platens.

Each swinging arm is guided to and from the pressing position between its respective pair of platens by a system of horizontal guide rails including fixed guide rails supported exteriorly of the press and cooperating vertically movable guide rails carried by one of the pair of platens, as for example the lower platen. The guide rails for each of the several arms in either of the two vertically spaced sets of arms are substantially identical and are supported one above the other at predetermined vertical spacings so as to underlie their respective swinging arms and in turn support the latter at a desired elevation to permit insertion of the corresponding panel forming die between the proper pair of platens. The fixed guide rails are located to support the swinging arms at the limits of their pivotal movement away from the platens and extend toward the platens sufficiently to support the arms throughout the extent of the aforementioned manually controlled swinging movement desired to facilitate loading and unloading of the panel forming dies.

The vertically movable guide rails extend outward from the platens to which they are secured and are arranged to receive and support their respective swinging arms as the latter swing toward the platens and ride off the fixed guide rails. Thus each arm and die thereon are guided by guide rails integral with the lower platens directly to the pressing position whereat the die is interposed between a selected pair of platens. Thus guided support for the arm and die at the proper elevation with respect to the platens is assured at all times. The platens with their vertically movable guide rails and the swinging arms supported thereby may be raised or lowered during a pressing operation without disturbing the relationship therebetween.

Details of a preferred embodiment of the present invention are shown by way of example in the drawings wherein.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
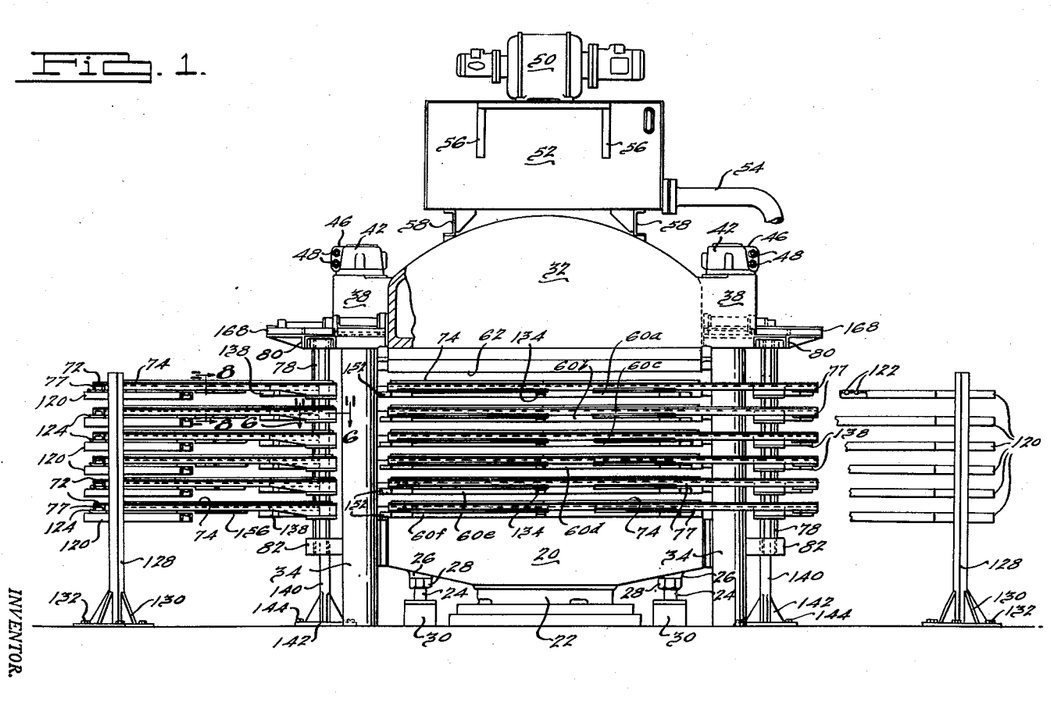
Fig. 1 is a fragmentary front elevation with portions broken away showing a multiple platen press and feeding or loading means therefor constructed in accordance with the present invention.
Figure 9:
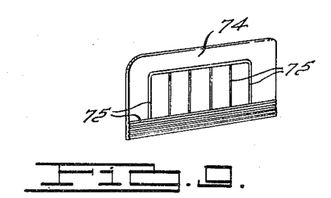
Fig. 9 is an isometric view of a panel adapted to be handled by the press and loading mechanism of the present invention.

Referring to the drawings, a multiple platen press and panel loading means therefor constructed in accordance with the present invention is shown wherein a lower jaw or pressure exerting member 20 of a hydraulic press is supported on a seat or base 22, Fig. 1. Vertically movable within the base 22 is a hydraulic ram (not shown) suitably secured at its upper end to the under side of the jaw 20 and hydraulically actuated to raise or lower the latter in accordance with the requirements of a compressing or bonding operation in the fabrication of a laminated panel, Fig. 9. A plurality of vertical guide rods 24 depend from a corresponding plurality of pads or bosses 26 provided by the jaw 20 on the underside thereof and are rigidly secured to the pads 26 by screw threaded means including the nuts 28. The lower end of each rod 24 extends downward into a vertical guide cylinder 30 for guided movement therein in accordance with operation of the jaw 20.

Figure 2:
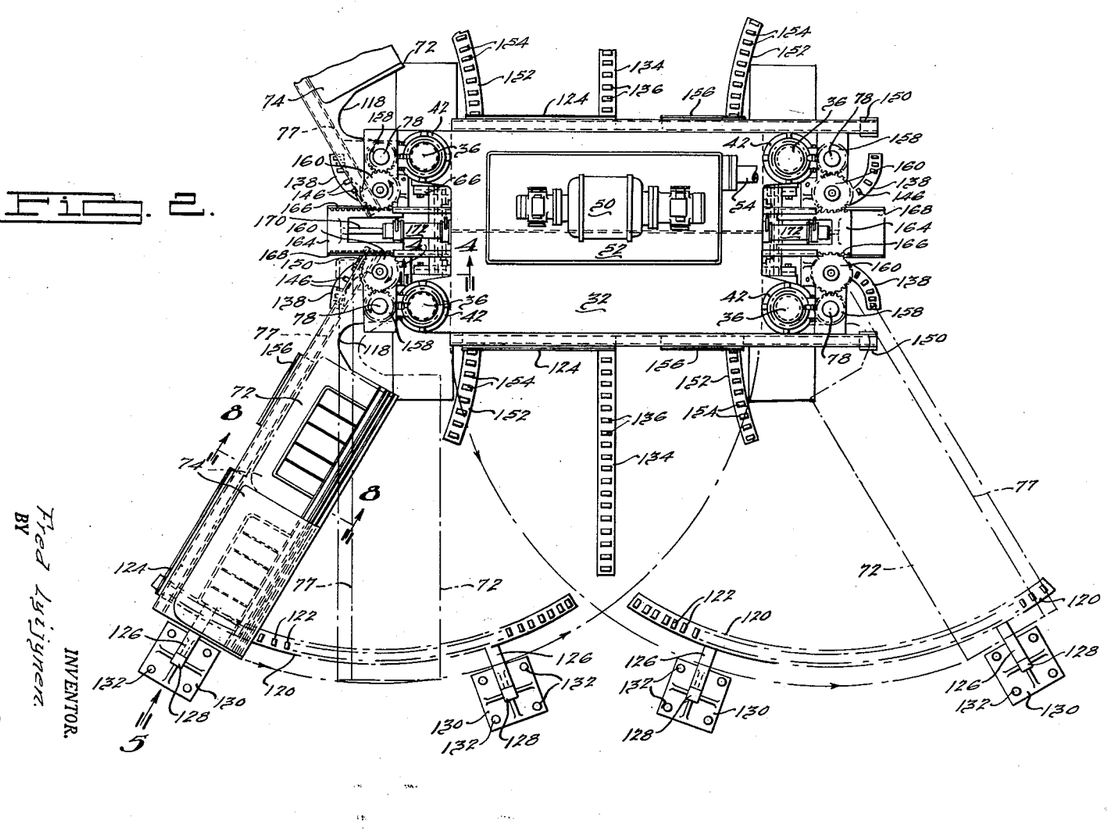
Fig. 2 is a fragmentary plan view of the press and loader shown in Fig. 1.
Figures 3, 4, 5:
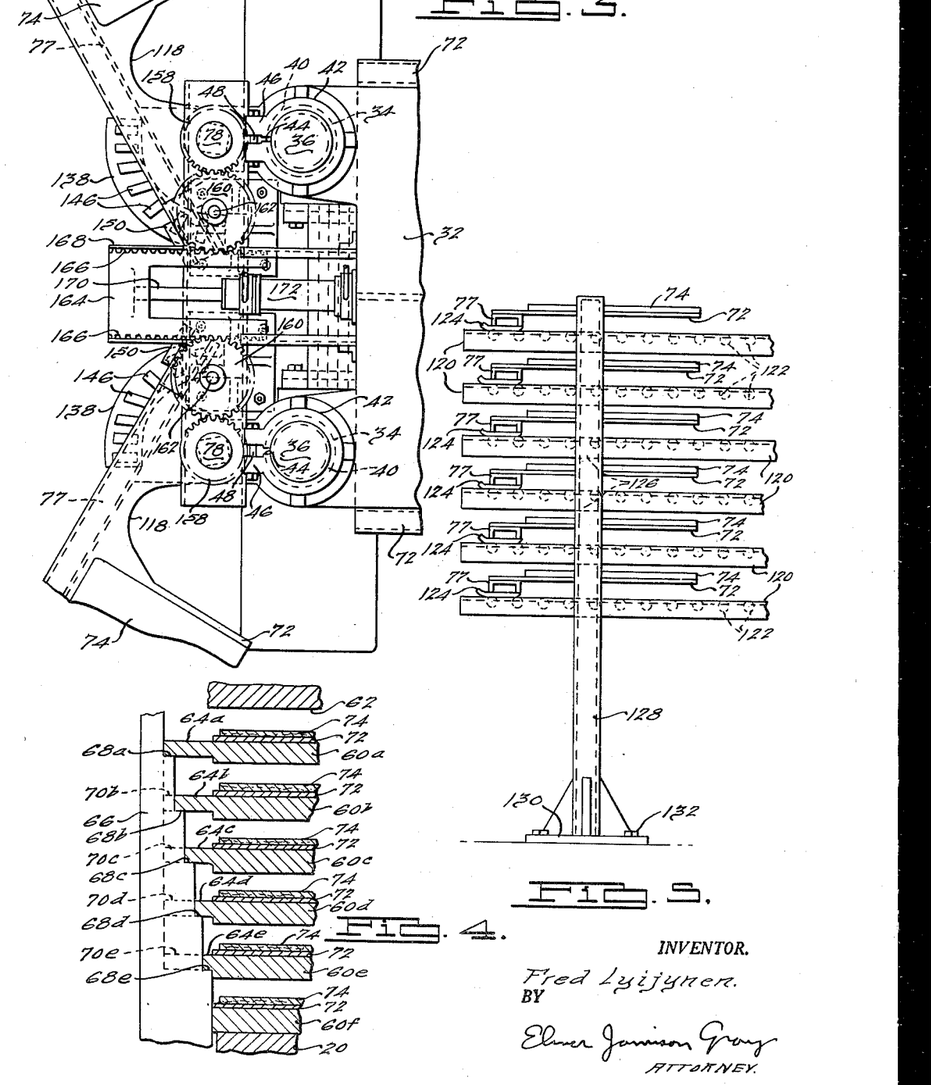
Fig. 3 is a fragmentary enlarged plan view similar to Fig. 2, showing the actuating mechanism for the left hand die supporting arms.
Fig. 4 is a fragmentary enlarged section taken in the direction of the arrows substantially along the line 4—4 of Fig. 2, showing the mounting for the multiple platens within the press.
Fig. 5 is a fragmentary enlarged end view of one set of the die supporting arms, taken in the direction of the arrow 5 of Fig. 2.

Directly over and spaced vertically from the jaw 20 is a fixed head or pressure resisting upper jaw member 32 suitably supported by four upright corner pillars or stanchions 34 having upper ends 36 of reduced diameter extending through holes provided therefor in four load supporting pads or bosses 38, Figs. 1, 2 and 3, which project laterally from the head 32 essentially at the corners thereof. The base of each boss 38 rests on an underlying load supporting shoulder 40 provided at the base of the corresponding reduced pillar extension 36, whereby the weight of the head 32 is carried by the pillars 34. The upper portion of each reduced extension 36 projects above its corresponding boss 38 and is preferably screw threaded to receive a threaded capping clamp 42 which is screwed tightly against the upper portion of the said boss 38. An axially extending slot 44 extends the length of each clamp 42 along one side thereof and spaces a pair of essentially radially extending arms 46 integral with the clamp 42. The arms 46 of each clamp 42 are selectively drawn toward each other by a clamping assembly including a bolt 48, Fig. 3, whereby each clamp 42 securely grips the adjacent extension 36 in a clamping action to resist the upward pressure exerted on each pad 38 and the head 32 by the jaw 20 during a compressing operation. Also the lower ends of the pillars 34 are securely anchored within the floor or ground to resist the upward pressure of the jaw 20.

The press mechanism illustrated is hydraulically actuated and powered from an electric motor driven hydraulic pumping unit or pressure generator 50 suitably connected within an electro-hydraulic control system, including a tank 52 and hydraulic line 54, with the aforementioned hydraulic cylinder for the jaw 20 and the hydraulic actuating cylinders for the loading mechanism described in more detail hereinafter. The pumping unit 50 is suitably supported on the tank 52 by supporting brackets 56. The tank 52 in turn is suitably supported on the head 32 by brackets 58.

The pumping unit 50 is suitably connected hydraulically with the tank 52 by means not shown, so as to deliver pressurized hydraulic fluid as desired to the hydraulically actuated mechanism of the press and loading means. Although the hydraulic type press is preferred for its efficiency and convenience in operation, it will be apparent from the following that the present invention is readily adaptable for use with other types of presses employing other pressure exerting means. Likewise, inasmuch as the present invention is not concerned with the specific electro-hydraulic control system employed and since the principle of various electro-hydraulic control systems suitable for use with the present invention are well known to the art, details of such a system are not illustrated herein.

In the present instance, a tier of six vertically movable platens 60 vertically spaced one above the other are employed by the press and are differentiated from each other in Fig. 4 by the subscripts a through f. Above the uppermost movable platen 60a is a fixed pressure resisting platen 62 suitably supported by the head 32 on the underside thereof. The five upper platens 60a through 60e are reduced at their opposite end portions 64a through 64e respectively and are supported thereat by a pair of fixed laterally spaced and vertical platen supports or sidewalls 66 of the press. The supporting means for the platens 60 are the same at opposite ends of the press, so that a showing of only one support 66 is made in Fig. 4.

The supports 66 are disposed at opposite ends of the press and are provided with a plurality of shoulders 68a through 68e stepped inwardly with respect to the press from top to bottom to support the platen ends 64a through 64e respectively. The steps or shoulders 68 extend only partially the horizontal depth of the press from front to rear. Correspondingly, each of the reduced end portions 64b through 64e is provided with an end slot 70b through 70e respectively dimensioned so that the slots 70 of each platen 60 will permit passage of all the shoulders 68 above its immediate supporting shoulders 68, but will not permit passage of the latter. For example, the platen 60e by virtue of its end slots 70e will pass over each of the supporting steps or shoulders 68a through 68d, but will be engaged and supported by the lowermost steps 68e. In a like manner, the platen 60d will pass over the steps 68a through 68c, but will be engaged and supported by the steps 68d; the platen 60c will pass over the steps 68a and 68b but not the steps 68c; and the platen 60b will pass over the steps 68a, but not the steps 68b. No end slot is provided for the platen 60a, which is thus supported by the upper steps 68a. The lower platen 60f is suitably supported by the upper surface of the lower press jaw 20.

Each platen 60 has a plane upper surface adapted to support the plane base of a panel forming die 72, Fig. 4. The latter is adapted to support a panel 74 thereon of the type which the apparatus disclosed herein is adapted to handle and is mounted in a manner described in detail hereinafter to permit its movement to a position overlying its respective platen 60 and also vertically with the platen during a bonding or compressing operation. The panel 74, Fig. 9, may comprise a number of superimposed layers, including by way of example a rigid foundation layer, a layer of padding or cushioning material overlying the foundation, and an exterior finish or trim layer overlying the padding. The assembled layers are consolidated or bonded together through the medium of a thermosetting bonding resin particularly along a plurality of ornamental grooves or depressed regions 75 embossed or impressed into the panel trim face. Such a panel 74 is particularly suited to form part of the interior decorative trim of an automobile body, as for example the interior door trim panel. However, the present invention is not dependent upon the specific panel construction described and is applicable in the fabrication of other panel structures or comparable laminated articles, as will be apparent below.

In application of the structure thus far described, prior to the bonding or pressing operation, the various layers of a complete panel 74 are assembled in their proper superimposed relation with a suitable bonding resin applied in an incompletely reacted state between selected layers and are placed between a corresponding pair of platens 60 face down on the upper face of one of each of the panel forming dies 72, i. e. with the exterior trim layer of the panel adjacent the upper die face. The latter is provided with a plurality of raised ribs or upset portions 76, Fig. 8, arranged to impress or emboss the desired pattern of grooves 75 into the panel 74 when the latter is pressed against the die 72 between the heated platens 60 upon operation of the press.

It is apparent that upon upward movement of the lower press jaw 20, the lowermost platen 60f will be raised until the upper layer of the inverted panel 74, in this case the rigid foundation, engages the plane under surface of the platen 60e. Thereupon the latter platen is raised from its supporting shoulders 68e. Similarly, upon continued upward movement of the jaw 20, each platen 60d through 60a in turn is raised from its respective supporting shoulders 68d through 68a. Finally, as the panel 74 on the uppermost movable platen 60a engages the pressure resisting platen 62, each panel 74 will be compressed between its respective pattern forming die 72 and the plane under surface of the platen immediately above, permitting a bonding operation to be performed on a number of panels 74 simultaneously between the multiple platens of the press.

In accordance with well known principles in the fabrication of such panels, the various platens 60 and 62 are maintained at a desired temperature and pressure to fuse and complete the reaction or polymerization of the thermosetting bonding resin. Thus the various panel layers are consolidated and bonded together particularly along the lines of optimum pressure exerted by the raised ribs or upset portions 76 of the dies 72, whereat the fused bonding resin is caused to permeate the padding and exterior panel layers and to bond the same permanently and securely to each other and to the foundation upon completion of the bonding reaction or setting of the bonding resin. At the same time, the ornamental depressions or grooves 75 are impressed or embossed into the panel face in accordance with the predetermined pattern of the ribs 76.

An important feature of the present invention is the loading mechanism for feeding unbonded panels 74 to the bonding positions between the platens and for removing the bonded or consolidated panels from the press after the bonding or compressing operation. Loading and unloading of the press is accomplished in the structure shown by means of four tiers or sets of six channel steel die carrying arms 77 in each set, Figs. 1, 2 and 5. The arms 77 of each tier or set are supported on one of each of four upright pivotal shafts 78 located adjacent one of each of the four corners of the press and are suitably mounted thereon for pivotal and axial movement at vertically spaced elevations corresponding generally to the vertical spacing of the platens 60. Each shaft 78 is pivotal from a pressing or bonding position at the limit of inward movement of the arms 77 toward the press, indicated by the solid line positions of the two right hand sets of arms 77, Fig. 2, whereat the arms 77 are parallel to the forward and rearward edges of the adjacent platen 60, through an arc of approximately 120° to a loading position exterior to the press, indicated by the solid line positions of the two left hand sets of arms 77, Fig. 2. Thus the forward and rearward sets of arms 77 at either the right or left end of the press are adapted to be operated alternately with the corresponding forward or rearward sets of arms 77 at the opposite end of the press to permit rapid loading and unloading of the press after successive bonding operations as described in detail hereinafter. Inasmuch as each tier of arms 77 and the mounting therefor which permits the pivotal and axial movement of the individual arms 77 are the same, a description of the operation and mounting of one arm 77 of one set or tier will suffice.

Figure 6:
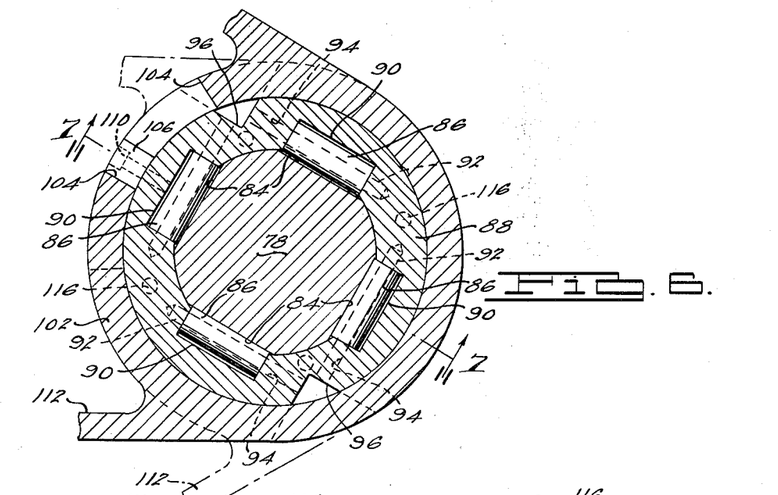
Fig. 6 is a fragmentary enlarged horizontal section showing the mounting for one of the die carrying arms, taken in the direction of the arrows substantially along the line 6—6 of Fig. 1.
Figure 7:
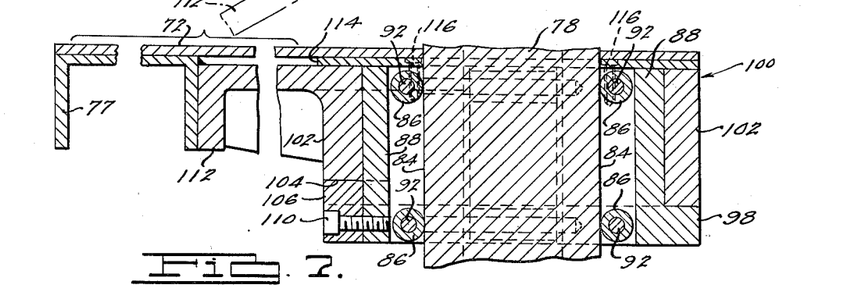
Fig. 7 is a fragmentary vertical section taken in the direction of the arrows substantially along the line 7—7 of Fig. 6.

The pivotal shaft 78 at each corner of the press is suitably supported for pivotal movement about its longitudinal axis by upper and lower bosses 80 and 82 respectively projecting laterally from the adjacent corner pillar 34, Fig. 1. Referring particularly to Figs. 6 and 7, each shaft 78 is generally cylindrical with four circumferentially spaced longitudinally extending flat portions 84 serving as runways for four pairs or sets of rollers 86 employed with each arm 77 to facilitate vertical movement thereof. Also provided for each arm 77 is a generally tubular sleeve bushing 88 slidably mounted on the shaft 78 and providing two pairs of diametrically opposed recesses 90 having the rollers 86 supported therein in rolling engagement with the flats 84 along opposite sides of the shaft 78.

Each roller 86 is rotatable on a horizontal journal pin 92 passing axially through the roller 86 and having its ends securely embedded within pinholes 94 opening into the body of the bushing 88 from opposite sides of the slots or recesses 90. Access to the pins 92 for their insertion into or removal from their respective pinholes 94 is permitted by a diametrically opposed pair of right angular V-notches or grooves 96 extending axially within the external periphery of the bushing 88, whereby the pinholes 94 open substantially perpendicularly at the sides of the grooves 96. It is apparent from the mounting described that the engagement between the rollers 86 and the flats 84 key the bushing 88 to the shaft 78 for rotation therewith. However, the bushing 88 is freely movable axially along the shaft 78 by reason of the rolling engagement between the rollers 86 and the flats 84.

Figure 8:
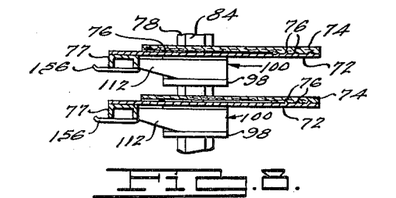
Fig. 8 is a fragmentary enlarged section taken substantially in the direction of the arrows along the lines 8—8 of Figs. 1 and 2.

A substantially annular flange 98 extends radially from the base of the bushing 88 and provides a support or seat for a bracket casting, indicated generally by the numeral 100, Fig. 8. The latter comprises a cylindrical sleeve portion 102 which fits over the outer cylindrical surface of the bushing 88 and rests on the flange 98. A limited pivotal movement of the bracket 100 relative to the keyed shaft 78 and bushing 88 is permitted by a downward opening circumferentially extending movement limiting slot 104 within the lower edge of the bearing portion 102. Extending upward from an opening or break in the flange 98 is a movement limiting lug 106 which is secured at its base within said opening to the body of the sleeve 88 by a countersunk screw 110, Fig. 7. The upper portion of the lug 106 rides within the slot 104, Fig. 6, so as to limit the relative pivotal movement between the bracket 100 and bushing 78 within a desired range of approximately 30° as indicated between the solid and phantom line positions shown in Fig. 6. When the shaft 78 is at the aforementioned loading and unloading position, this range is indicated between the solid and phantom line positions shown for the left hand arms 77 of Fig. 2, whereby loading and unloading of the panels 74 are facilitated as described hereinafter.

Also integral with each bracket 100 and extending from the cylindrical sleeve portion 102 are a pair of diverging arms 112 which extend to the adjacent inward or hub end of the corresponding arm 77 and are secured thereat, as by welding. Each bracket 100 is prevented from axial upward movement relative to its sleeve bushing 88 by a generally annular capping washer 114 fitting around the shaft 78 so as to overlie the adjacent upper surfaces of the sleeve 102 and bushing 88 and being secured to the latter by a plurality of screws 116. Also supported by each die carrying arm 77 and suitably secured to the upper surface thereof, as by welding, is one of the aforementioned pattern forming dies 72, Figs. 5, 7 and 8.

It is apparent from the foregoing that each swinging die supporting arm 77 is keyed with its shaft 78 for pivoting therewith and is axially movable along the shaft 78 to permit vertical adjustment of the height of the die 72. Accordingly, each of the six dies 72 in each tier may be positioned to overlie its corresponding platen 60, so that upon suitably pivoting any one of the four shafts 78, the six arms 77 keyed therewith will be pivoted as a unit toward the press to interpose a die 72 between each pair of adjacent platens.

In the above connection, it is to be observed that each die 72 is welded along one edge to its respective arm 77, Figs. 2 and 5, with the body of the die 72 projecting from the arm 77 in such a manner as to be inserted at a pressing position between the platens when the arm 77 is swung into parallelism with the front and rear edges of the platens 60, as shown by the two right hand sets of arms 77, Fig. 2. In such positions, the innermost side of each arm 77 abuts the edge of the adjacent platen 60 and serves as a positioning stop to locate the die 72 properly between the platens for the bonding or pression operation. Also as indicated in Figs. 2 and 3, a blank portion of each die 72 near the hub of the pivot movement is recessed at 118 to fit around the pillar 34 when the arm 77 swings toward the press.

In order to permit proper vertical spacing of the arms 77 so that the dies 72 supported thereon will overlie their respective platens 60, suitable supporting and guide means are provided which in the present instance comprise a plurality of vertically spaced horizontal roller type guide tracks arranged in substantially four identical systems, one system adapted to support the inner and outer ends of the arms 77 of each set.

As may be observed particularly in Figs. 1, 2 and 5, the outer ends of the six arms 77 of each set are supported by a tier or set of six roller type tracks 120 extending concentrically about the pivot axis of the corresponding shaft 78 sufficiently to support the arms 77 as they swing toward the press from the outer loading position through a substantial arc of not less than that permitted by the free play of the movement limiting slots 104. Movement of each arm 77 along its track 120 is facilitated by a plurality of radially extending rollers 122 journaled on each track 120 and adapted to engage a shoe or rider 124 secured to the under side of the distal end of each arm 77 for riding along the rollers 122. Each track 120 is supported by a pair of horizontal brackets 126 which extend from a corresponding pair of upright standards 128, Figs. 2 and 5, and which in turn are supported by footings 130 securely anchored to the flooring by a plurality of bolts 132.

Supported by each platen 60 and projecting horizontally from each of the forward and rearward edges thereof are central supporting tracks 134 similar to the tracks 120 and arranged in forward and rearward extending tiers, Figs. 1 and 2. The tracks 134 are provided with a plurality of rollers 136 on which the shoes 124 ride after leaving their respective tracks 120 upon continued swinging of the arms 77 toward the press. Obviously the supporting tracks 120 and 134 for each arm 77 are in substantially the same plane, determined with respect to the upper surface of the associated platen 60 so that as the arm 77 is swung toward the press from the loading position, the supported die 72 will immediately overlie the proper platen 60. By virtue of the central location of the outward extending tracks 134, the forward tier of tracks 134 will receive and support the forward tiers of swinging arms 77 at either the right or left end of the press. Similarly the rearward tier of tracks 134 will receive and support the rearward tiers of swinging arms 77 at either the right or left ends of the press.

The hub or inward ends of the arms 77 of each tier are supported by a set of horizontal arcuate roller carrying tracks 138 concentric about the associated shaft 78 and supported in turn by an upright stand 140 mounted on a footing 142 which is secured to the flooring by a plurality of bolts 144, Fig. 1. Each track 138 is provided with a plurality of transverse rollers 146 on which ride a proximal shoe 150 secured to the under side of the hub end of the supported arm 77 similarly to the shoe 124. The supporting tracks 138 for the hub ends of the arms 77 extend arcuately toward the press to support the arms 77 through substantially the same arc of movement for which the outer tracks 120 are provided.

Similarly to the mounting of the centrally disposed tracks 134, a roller type supporting track 152 is secured to each corner of each platen 60, completing a tier of six vertically spaced tracks 152 at each corner of the press to receive the hub ends of the arms 77 from the corresponding adjacent tracks 138 and to guide the supported dies 72 onto their respective platens 60. Each track 152 is provided with transverse rollers 154 on which rides a central shoe 156 secured to the under side of the central portion of the respective arm 77.

As indicated in Fig. 2, the four sets of tracks 152 extend arcuately forward and rearward respectively from the forward and rearward corner edges of the platens 60 and also extend laterally to terminations which are just short of the adjacent edges of the dies 72 when the latter are at the aforesaid inward limit of movement permitted by the slots 104 when the shafts 78 are at the loading positions. Thus when the die supporting arms 77 at one end of the press are at the bonding or pressing position with their supported dies 72 between the platens 60 and the latter are raised by the jaw 20 during a pressing operation, the outer extremities of the tracks 152 will not catch on the sets of die plates 72 being unloaded or loaded as described below at the other end of the press.

Although it will be readily apparent that other power means may be suitably employed to actuate the swinging arms 77, hydraulic power means are preferred in the embodiment shown, particularly because of the ease and convenience with which it may be controlled and its availability from the same pressure generating source 50 employed to actuate the hydraulic press. Referring particularly to Fig. 3, the upper end of each shaft 78 is keyed to a driving gear 158 which in turn meshes with an idler gear 160 suitably journaled on a vertical spindle 162 supported by the end wall of the press. Each pair of idler gears 160 meshing with their respective driving gears 158 at each end of the press are engaged by a double toothed gear rack 164 having parallel forward and rearward sets of teeth 166 meshed respectively with the adjacent teeth of the forward and rearward idler gears 160. The gear rack 164 at each end of the press rides within a guide frame 168 and is suitably connected with a plunger arm 170 of a hydraulic cylinder 172 for reciprocating actuation. The cylinders 172 are powered from the pump 50 and are operatively connected within a suitable hydraulic control circuit, not shown, so as to be under the selective control of the operator.

It is apparent that upon endwise extension of either plunger 170, the gear rack 164 connected therewith is moved endwise away from the press, thereby swinging the arms 77 away from the platens by virtue of the above described gear chain. Upon inward endwise movement of the rack 164, the direction of movement of the swinging arms 77 is reversed and the latter swung inward toward the press to interpose the supported die plates 72 between the platens 60.

In completing a cycle of operation of the present invention, assuming that the lower jaw 20 of the press is at its lower rest position on the seat 22 and that all four tiers or sets of the arms 77 are at the loading positions at substantially the outer limits of their swinging movement away from the press, i. e., with the plunger arms 170 extended at opposite ends of the press, the operator may load the laminated but unbonded panel material onto the uppermost dies 72 carried by the two uppermost arms 77 at one end of the press, for example the left end, Fig. 2.

In the present instance, each platen 60 is adapted in size with respect to the panels 74 to accommodate four of the latter arranged side by side in a rectangular pattern, one panel 74 covering substantially one of each of the four quadrants of the platen area. Accordingly, each die plate 72 is adapted in size to accommodate two panels 74 end to end simultaneously, the two dies 72 at the same level at each end of the press cooperating to utilize the full area of one of each of the platens 60. The laminated material for two panels 74 are placed on each die 72 with the exterior finish or trim layer of the panel 74 face downward.

In Fig. 2, a panel 74 to be bonded is shown in position covering the outer or distal portion of the die 72. The inner or proximal portion of the die plate 72 is uncovered to receive a set of laminations for another unbonded panel 74 which will lie end to end adjacent the panel 74 shown in position. Upon loading the laminated material for two panels 74 face downward on each of the two upper dies 72 at one end of the press, the supporting arms 77 for these upper dies 72 are manually swung by the operator toward the press to the limit of movement permitted by the lost motion slots 104, i. e., to the phantom position of the left hand arm 77, Fig. 2. The dies 72 second from the top are thus exposed to facilitate their loading, whereupon the second arms 77 from the top are moved forwardly to the phantom position exposing the third pair of dies 72 from the top. The loading of both tiers of dies 72 at the left end of the press thus continues progressively downward until twenty-four panels 74 are loaded on the twelve dies 72. Thereafter the hydraulic system is actuated to withdraw the plunger 170 at the left end of the press and the two shafts 78 at the left end of the press are rotated in the direction to swing the arms 77 toward the platens 60.

After the shafts 78 turn through the predetermined arc of approximately 30°, the riders 106 keyed to the sleeves 88, which in turn are keyed by the rollers 86 to the shafts 78, finally abut the ends of the slots 104 and cause the respective arms 112 and connected die supporting arms 77 to swing toward the platens 60. The arms 77 glide freely on their shoes 124 and 150 along the fixed roller tracks 120 and 138 respectively and are supported thereby at the proper elevations to permit their transfer readily to the continuing roller tracks 134 and 152 carried by the platens 60.

As the two tiers of arms 77 at the left end of the press continue their swinging movement toward the platens 60, the supported dies 72 are interposed between their respective platens at the bonding position, whereat the forward and rearward edges of the platens 60 serve as movement limiting or locating stops to assure proper positioning of the dies 72 between the platens 60. Likewise, at this position, suitable movement limiting means not shown are actuated to stop the movement of the plungers 170.

With the dies 72 and unmolded panels 74 thereon properly positioned or interposed between the platens of the press, the latter is hydraulically actuated to raise the jaw 20, whereupon each panel is compressed between its underlying die 72 and the under surface of the platen immediately above. Upward movement of the dies 72 and their supporting arms 77 upon upward movement of the platens 60 during a compressing operation is readily permitted by virtue of the rollers 86 journaled within each sleeve bushing 88 so as to roll along the flats 84 of the shafts 78.

Upon completion of the bonding operation, the press jaw 20 is lowered, permitting the platens 60 to settle on their respective seats 68, whereupon the hydraulic system is actuated to extend the left hand plunger 170 and to withdraw the two left hand tiers of arms 77 actuated thereby together with the corresponding dies 72 and bonded molded panels 74, from the press. Movement limiting means not shown are preferably included within the hydraulic system for automatically stopping the endwise outward movement of the plunger 170 when the swinging arms 77 actuated thereby are returned substantially to the position at which the driving lugs 106 initially engaged the end walls of their respective lost motion slots 104 at the commencement of the cycle, phantom view of the left hand arms 77, Fig. 2.

The molded panels 74 may be unloaded successively from the bottom up by manually pulling the lowermost arms 77 from the phantom position, Fig. 2, to the limit of outward movement permitted by the lost motion slot 104, solid view, Fig. 2, exposing the said lowermost panels 74 and permitting their removal from their dies 72. The second and succeeding arms 77 from the bottom are similarly swung outward in turn to the outer limit of movement permitted by the lost motion slots 104 and unloaded.

In the meantime, during the compressing operation on the panels 74 carried by the arms 77 at the left end of the press, the arms 77 at the right end of the press are loaded in substantially the manner employed to load the left hand arms. Accordingly, while the left hand arms 77 are being unloaded, the hydraulic mechanism at the right end of the press is actuated to swing the two right hand sets of arms 77 toward the press and between the platens substantially as described in connection with the left hand arms 77. It is accordingly apparent that the press may be maintained continuously operative by alternately feeding from first one end of the press and then the other. While the arms at one end of the press are between the platens in a pressing operation, the arms 77 at the other end of the press are being unloaded and reloaded for the succeeding pressing operation.

It is to be noted from the sequence of operation described that the hydraulically actuated plungers 170 are used only while the lower jaw 20 is not under pressure. Thus the hydraulic cylinders 172 may be powered from the same hydraulic pressure source employed to actuate the press jaw 20 without in any way interfering with the efficiency of the pressing operation and without the requirement of a pumping system 59 of greater capacity than normally required for operation of the press alone. Accordingly the single pumping system 59 serves a dual purpose and is efficiently utilized substantially at all times.

It is to be noted further that by virtue of the pivotal mounting of the arms 77 at the corners of the press, as shown, the loading and unloading of the dies 72 are permitted without exposing the press operator to the direct heat of the platen 60. One or more operators will normally stand at the ends of the press beyond the limits of swinging movement of the arms 77 whereat they may work in comparative comfort, being shielded from the principal heat of the platens by the end walls of the press.

I claim:

1. In a press, a pair of relatively movable pressing members normally spaced apart, a pair of swinging die supporting arms, and means pivotally supporting said arms at opposite sides of the press for swinging horizontally and alternately from positions outside the press to positions between said pressing members.

2. In a press having relatively movable vertically spaced pressing members, a swinging arm pivotally mounted at one side of the press to swing horizontally into position between the pressing members and movable vertically within the press upon vertical movement of a pressing member.

3. In a hydraulically actuated press having relatively movable pressing members, a pair of swinging die supporting arms adapted to be employed alternately with the pressing members and pivotally mounted for swinging to and from a pressing position between said pressing members, hydraulically actuated means for selectively swinging said arms to and from said pressing position between pressing operations, and a single hydraulic pressure generator for both said press and said hydraulically actuated means.

4. In a hydraulic press having relatively movable pressing members and a hydraulic pressure generator in an operative hydraulic system for actuating said pressing members, a pair of swinging supports adapted to be employed with the pressing members alternately with each other and pivotally mounted for movement to and from a pressing position between said pressing members, and means operatively connected with said supports for selectively swinging the same to and from said pressing position including hydraulically actuated means in an operative hydraulic system connected with said first named system for actuation by said pressure generator.

5. In a press having relatively movable pressing members, a pair of swinging arms mounted for swinging alternately to and from a pressing position adjacent said pressing members, and a die member supported on each arm for movement therewith, each die member having a portion projecting from the arm to receive material to be fabricated in the press and to swing said material between said pressing members upon swinging movement of the associated supporting arm to the pressing position.

6. In a press having a pair of platens movable relatively to each other in a vertical direction, a pair of swinging arms mounted for swinging to and from a pressing position about a corresponding pair of vertical axes spaced to permit alternate use of the arms in successive pressing operation, the arms being also axially movable along their axes of swinging, and a die member supported on each arm for movement therewith, each die member having a portion projecting from the arm to support material to be fabricated by the press and to swing the material between said platens upon swinging movement of the associated supporting arm to the pressing position.

7. In a press, a tier of press members mounted for vertical movement relative to each other, a corresponding tier of vertically spaced swinging die carrying arms, means pivotally supporting said arms at one side of the press for swinging about a common vertical axis from loading positions outside the press to operative positions between said press members.

8. In a press having a pair of platens movable relatively to each other in a vertical direction, a pair of swinging arms mounted for swinging to and from a pressing position about a corresponding pair of spaced vertical axes and movable axially at the pressing position, a die member mounted on each arm for movement therewith, each die member having a portion projecting from the arm to support material to be fabricated by the press and to swing with the material loaded thereon between said platens upon swinging movement of the associated supporting arm to the pressing position, and guide track means for guiding said arms to the pressing position including guide track portions projecting from one of said platens and movable therewith.

9. In a press having a plurality of normally spaced platens relatively movable toward and away from each other during a pressing cycle, two sets of platen feeding members mounted for swinging movement to and from a pressing position and also for movement with said platens during a pressing operation, the axes of swinging movement of said two sets of members being spaced to permit alternate use of each set in successive pressing operations, each member being adapted to support material to be fabricated by the press and the members of each set being spaced in accordance with the spacing of said platens for insertion therebetween at the pressing position.

10. In a press, a tier of normally spaced press members mounted for vertical movement relative to each other, a corresponding tier of spaced swinging die carrying arms, means supporting said arms at one side of the press for swinging about a common vertical axis from loading positions outside the press to operative positions between said press members and for moving vertically at said operative positions.

11. In a press, a tier of normally spaced press members mounted for vertical movement relative to each other, two tiers of vertically spaced swinging die carrying arms, means supporting the arms of each tier for swinging about one of each of two spaced vertical axes to and from operative positions between said press members and for moving axially with the press members at the operative positions.

12. In a press having a plurality of spaced platens superimposed one above another in a tier and relatively movable toward and away from each other during a pressing cycle, two sets of platen feeding members mounted for horizontal swinging movement toward and away from said platens and also for vertical movement with said platens during a pressing operation, the axes of swinging movement of said two sets of members being spaced to permit alternate use of each set in successive pressing operations, and a forming die mounted on each member for movement therewith and adapted to receive and support material to be fabricated by the press, the members of each set being spaced in accordance with the spacing of said platens so as to interpose the dies and the material loaded thereon between adjacent pairs of platens and to withdraw the dies and material from the platens by swinging movement to permit unloading and reloading of the dies between pressing operations.

13. In a press having relatively vertically movable pressing members, a plurality of vertically spaced swinging arms, means supporting the arms at one side of the press for swinging horizontally to a position between the pressing members and for moving vertically by engagement with the latter.

14. In a press having a plurality of spaced platens superimposed one above another in a tier and relatively movable toward and away from each other during a pressing cycle, two sets of platen feeding members mounted for horizontal swinging movement toward and away from said platens and also for vertical movement with said platens during a pressing operation, the axes of swinging movement of said two sets of members being spaced to permit alternate use of each set in successive pressing operations, a forming die mounted on each member for movement therewith and adapted to receive and support material to be fabricated by the press, the members of each set being spaced in accordance with the spacing of said platens so as to interpose the dies and the material loaded thereon at pressing positions between adjacent pairs of platens and to withdraw the dies and material from the platens by swinging movement, and guide track means for guiding said members to the pressing positions upon swinging movement of said members toward said platens, said guide track means including guide track portions projecting from selected platens for movement therewith during a pressing operation.

15. In a press, a tier of press members mounted for vertical movement relative to each other, two tiers of vertically spaced swinging die carrying arms, means pivotally supporting the arms of each tier for swinging about one of each of two spaced vertical axes to and from pressing positions between said press members, and means for selectively swinging the arms of either tier in unison.

16. In a press having a plurality of normally spaced platens relatively movable toward and away from each other during a pressing cycle, two sets of platen feeding members mounted for swinging movement to and from said platens, the axes of swinging movement of said two sets of members being spaced to permit alternate use thereof in successive pressing operations, and a forming die mounted on each member for movement therewith and having a portion projecting from the member to support material loaded thereon to be pressed, the members of each set being spaced in accordance with the spacing of said platens for swinging the projecting die portions and the material loaded thereon to pressing positions between adjacent pairs of platens, said members comprising movement limiting stops for accurately locating said projecting die portions at the pressing positions.

17. In a press having a plurality of normally spaced platens relatively movable toward and away from each other during a pressing cycle, two sets of platen feeding members mounted for swinging movement toward and away from said platens, the axes of swinging movement of said two sets of members being spaced to permit alternate use of each set in successive pressing operation, each member being adapted to support material to be fabricated by the press and the members of each set being spaced in accordance with the spacing of said platens for swinging the material to pressing positions between adjacent pairs of platens and to withdraw the material from the platens, means for swinging said members in unison to and from said pressing positions, each member being also swingable independently of the others to facilitate loading and unloading thereof.

18. In a press having a plurality of normally spaced platens relatively movable toward and away from each other during a pressing cycle, two sets of platen feeding members mounted for swinging movement toward and away from said platens about spaced axes for alternate use in successive pressing operations, each member being adapted to support material to be fabricated by the press and the members of each set being spaced in accordance with the spacing of said platens for swinging the material to and from pressing positions between adjacent pairs of platens, operating means for swinging either set of said members as a unit to and from said pressing positions, and lost motion means connecting said operating means with said members to allow limited swinging of each member independently of the others exteriorly of the platens to facilitate loading and unloading of the members.

FRED LYIJYNEN.

REFERENCES CITED

The following references are of record in the file of this patent:

UNITED STATES PATENTS

| Number | Name | Date |
| --- | --- | --- |
| 709,285 | Wilkes | Sept. 16, 1902 |